Figure 1:
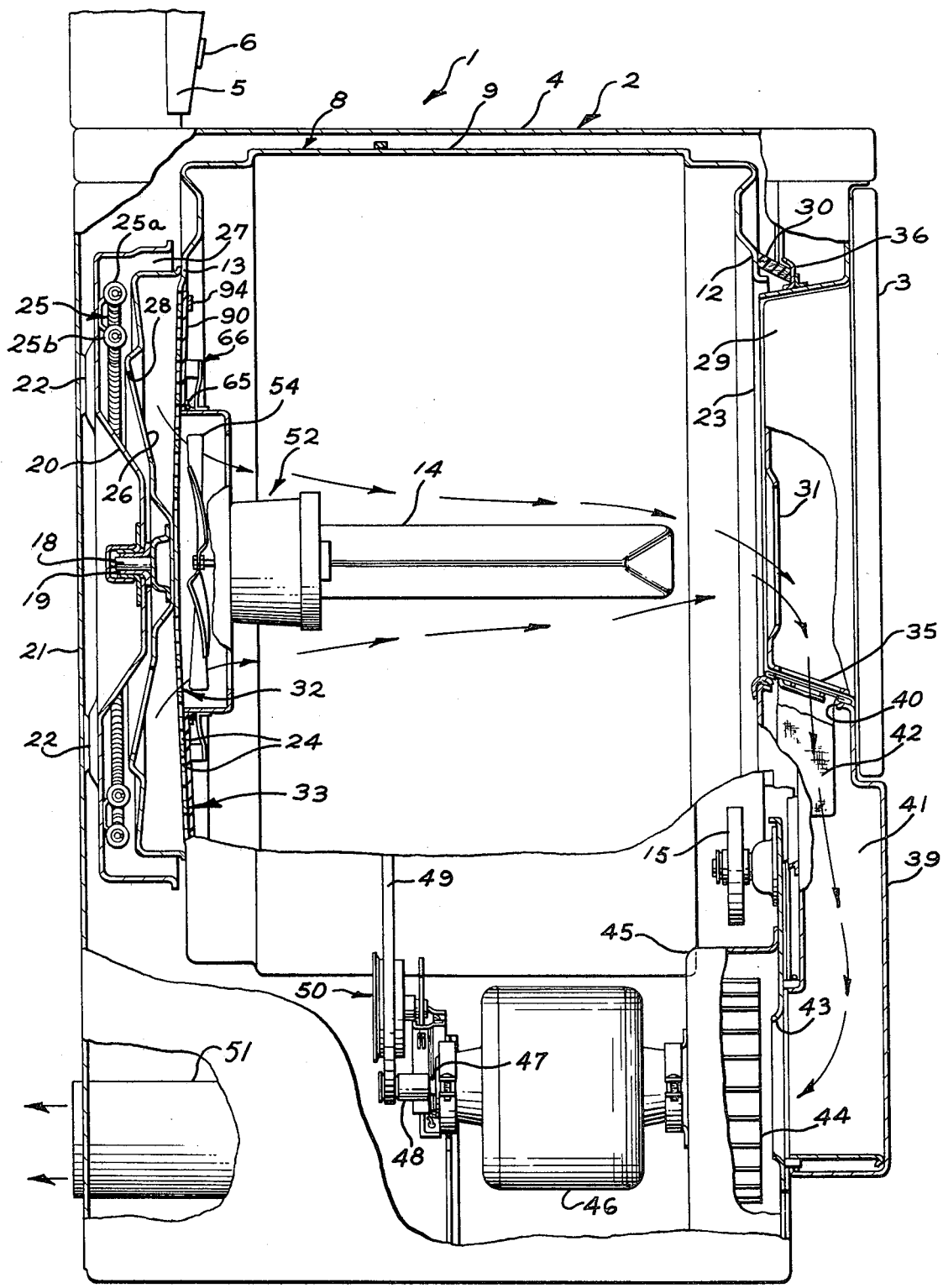
Figure 2:
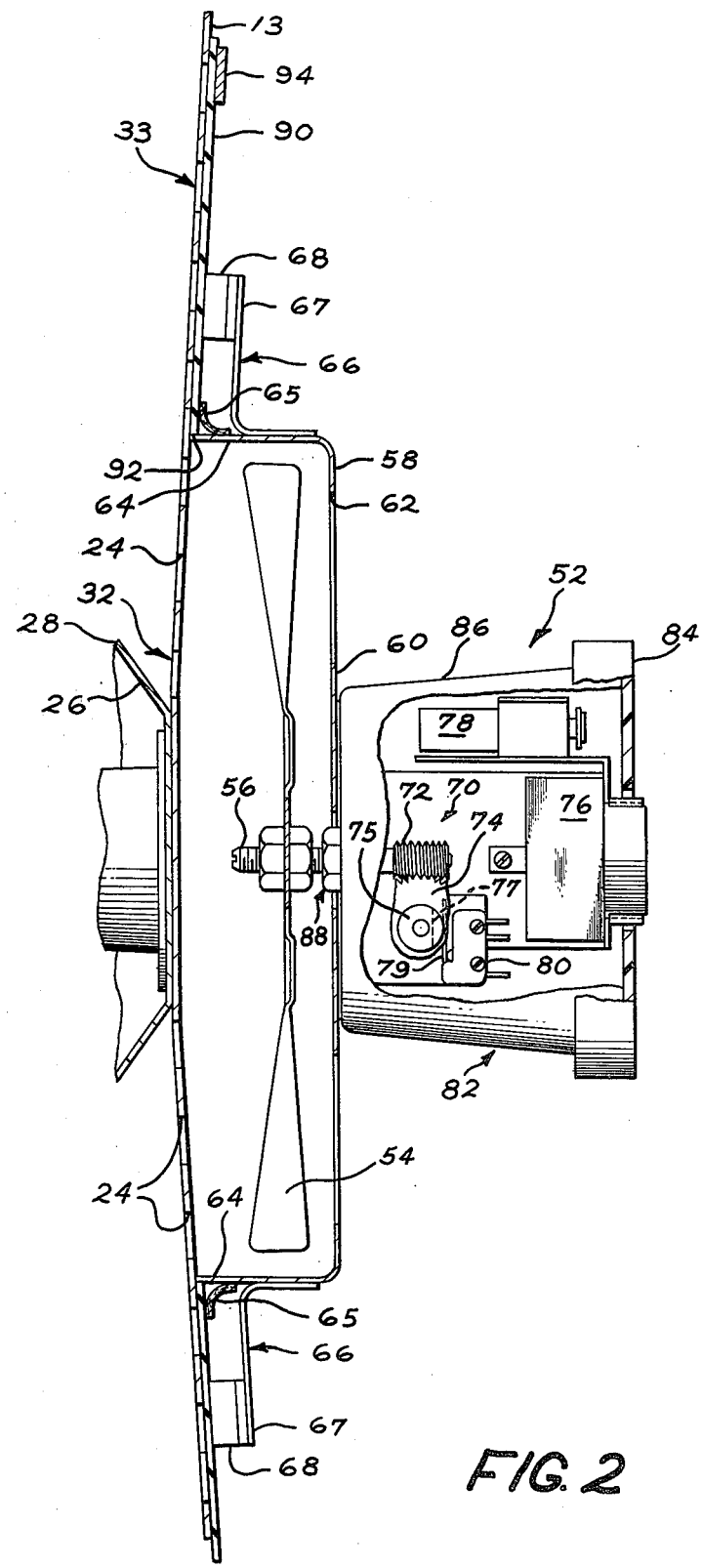
Figure 3:
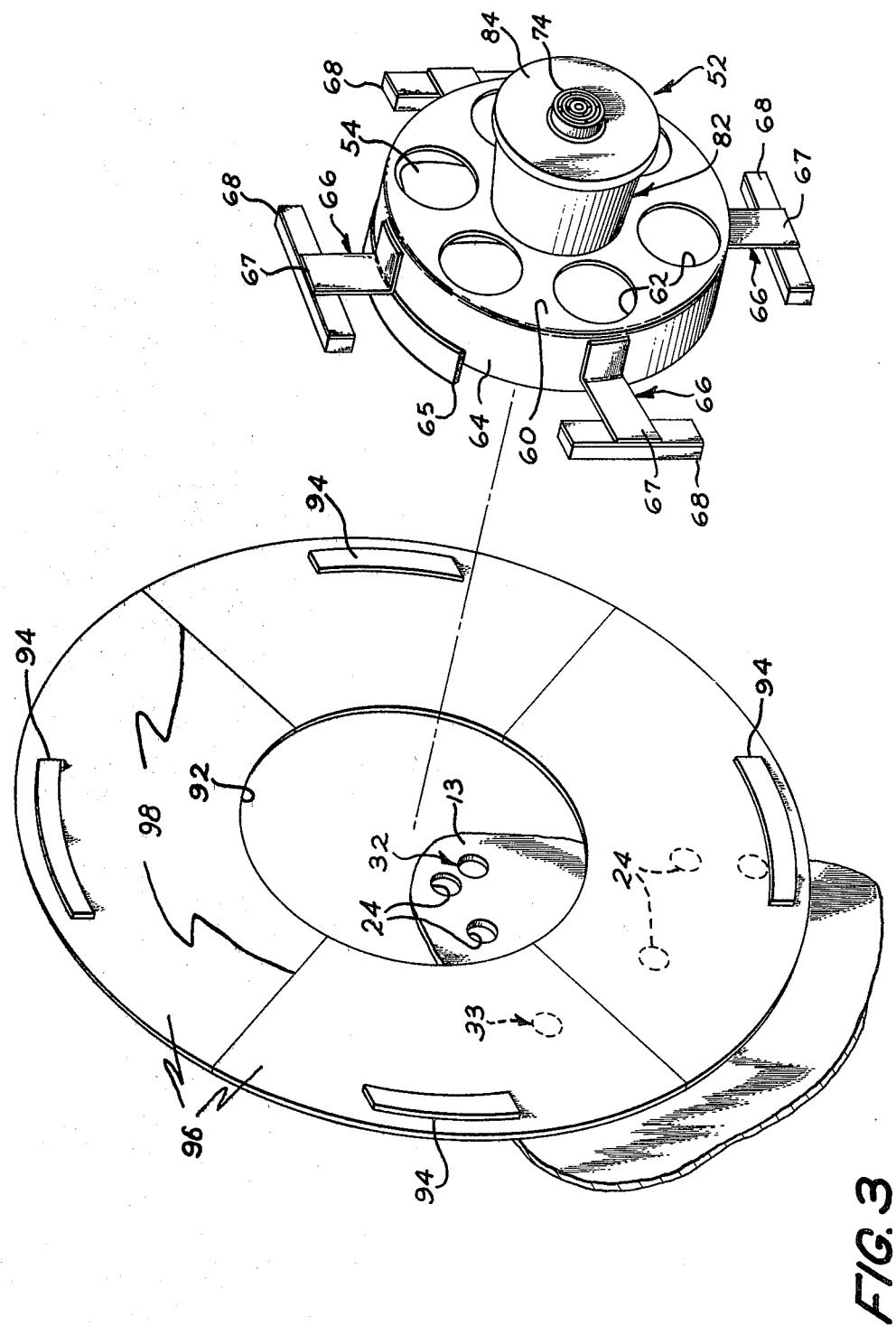

United States Patent [19]

Losert

[11] 4,081,997

[45] Apr. 4, 1978

[54] CLOTHES DRYER AIR FLOW TEST DEVICE AND METHOD

[75] Inventor: Gerhard K. Losert, Louisville, Ky.

[73] Assignee: General Electric Company, Louisville, Ky.

[21] Appl. No.: 771,408

[22] Filed: Feb. 23, 1977

[51] Int. Cl.² ............................................ G01M 19/00
[52] U.S. Cl. ..................................................... 73/168
[58] Field of Search ............. 73/168, 198, 229, 231 R, 73/231 M

[56] References Cited

U.S. PATENT DOCUMENTS 3,287,973  11/1966  Liebermann et al. ................. 73/198
3,823,611  7/1974  Rudow et al. ...................... 73/231 R Primary Examiner—Anthony V. Ciarlante
Attorney, Agent, or Firm—Frederick P. Weidner; Francis H. Boos

[57] ABSTRACT

An improved device and method for checking the adequacy of the rate of air flow in a rotating clothes dryer drum having air flow passing through a first centrally disposed set of perforations and a second set of perforations radially outward of the first set of perforations in the rear wall of the drum into the interior of the drum. The device comprises a rotatable fan and a counter assembly arranged to register the number of revolutions of the fan. There is provided a structure for removably attaching the device to the rear wall of the drum over the first set of perforations in the rear drum wall. A flexible circular skirt having a central opening is removably attached to the rear wall of the drum over and blocking air flow through the second set of perforations. With this device and method the rate of air flow to the clothes dryer drum may be tested by operating the clothes dryer and registering the number of revolutions made by the fan for a period of time and comparing that number to a number determined previously to be an adequate air flow rate.

8 Claims, 3 Drawing Figures will be described later. The circular skirt 90 may be made of any suitable material and it may even be made of magnetic material so that individual magnets are not necessary. The central opening 92 has a diameter that is slightly larger than the diameter of the shroud member 58 so that the device 52 may be received on the circular skirt 90 with the gasket 95 passing through the opening to make contact with the rear wall 13 of the drum 8. The overall diameter of the circular skirt 90 will depend on the diameter of the rear wall 13 of the drum that has the second set of perforations 32. The purpose of the circular skirt 90 is that when it is positioned inside the drum it will cover and block air flow through the second set of perforations 33 but air may flow through the central opening 92 and the first set of perforations 32.

The method of using the improved air flow testing device 52 is as follows. While the clothes dryer 1 is inoperative the front door 3 is opened and the circular skirt 90 is placed in the drum by attaching it to the rear wall 13 in a position to cover the second set of perforations 33. Since the skirt 90 is flexible it is easy to pass it through the opening 23 and place it on the rear wall 13 of drum 8 which has a larger diameter than the opening 23. The air flow test device 52 is then placed in the drum by positioning it in the center of the rear wall 13 with the magnets 68 retaining the device in its proper position. The device is placed over the first set of perforations 32 in the rear wall 13 of the drum. The door 3 is then closed and the clothes dryer machine is put into operation. As a result, the drum 8 carrying the device 52 will be rotated and the flow of air will proceed through the first set of perforations 32 in the rear wall 13 of the drum into the shroud member 58 through the blades of the fan 54 and the holes or perforations 62 in the rear wall 60 of the shroud 58. This flow of air will cause the fan 54 to be rotated and the speed of rotation will depend upon the velocity or rate of the air flow from the perforation 24 in the first set 32 in the rear wall 13 through the air flow test device 52. The rotation of the fan 54 causes the shaft 56 to be rotated in unison and that shaft in turn rotates worm gear 72 which is meshed with circular gear 74. The counter assembly 70 is arranged to register a predetermined number of revolutions. When the predetermined number of revolutions is reached the flat area of 77 of hub portion 75 causes switch 80 to be closed which triggers the audio device 76 whereupon a signal is given which may be heard from outside the clothes dryer. The person conducting the air flow test can determine the amount of time it takes from one audio signal to another and that time period can be compared to a performance chart to determine whether or not the rate of air flow is considered adequate for the clothes dryer machine on which the air flow test device 52 is installed. Since air flow through the second set of perforations 33 is prevented by the circular skirt 90 the registration of revolutions is much more accurate than without the skirt 90. After the air flow test is complete the front door 3 of the clothes dryer is opened and the air flow test device 52 including the skirt 90 is detached from the rear wall 13 and removed from within the drum 8.

By this improved air flow test method and device the person conducting the tests can determine whether or not the air flow rate is adequate or if there is some blockage or leakage that is disrupting the air flow characteristics and therefore the efficiency of the clothes dryer. Moreover, with this improved test device and method the clothes dryer machine may be operated under its normal conditions and the audio signal can be heard outside the machine so that its operation does not need to be stopped to determine the registration of the number of revolutions of the fan 54.

The foregoing is a description of the preferred embodiment of the invention. In accordance with the patent statutes, changes may be made in the disclosed device and the method in which it is employed without actually departing from the true spirit and scope of the invention as defined in the appended claims.

What is claimed is:

1. In a device for checking the adequacy of the rate of air flow in a rotating clothes dryer drum having air flow through a first centrally disposed set of perforations and a second set of perforations radially outward of the first set in the rear wall of the drum, including a rotatable fan, a counter assembly arranged and including means to register the number of revolutions of the fan, and means to removably attach the device to the rear wall of the drum over the first set of perforations, the improvement comprising:

a flexible circular skirt having a central opening and means to removably attach the skirt to the rear wall of the drum over the second set of perforations to block air flow therethrough whereby air flowing through the rear wall of the drum is caused to go through the central opening and the fan.

2. In the device of claim 1 wherein the means to attach the skirt to the rear wall are magnets.

3. In the device of claim 1 wherein the skirt comprises a plurality of hinged segments.

4. In the device of claim 1 wherein the central opening of the flexible circular skirt has a diameter slightly larger than the fan.

5. An improved method of checking the adequacy of the rate of air flow in a rotating clothes dryer drum having air flow through a first centrally disposed set of perforations and a second set of perforations radially outward of the first set in the rear wall of the drum comprising:

providing a device including a rotatable fan and a counter assembly that registers the number of revolutions of the fan, attaching a flexible circular skirt having a central opening to the inside of the rear wall of the drum to cover the second set of perforations and block air flow therethrough, attaching the device to the inside of the rear wall of the drum over the first set of perforations, turning on the clothes dryer to rotate the drum and flow air through the first set of perforations in the rear wall of the drum, detemining the number of fan revolutions for a period of time, and comparing the number of revolutions to a number determined previously to be an adequate air flow rate.

6. The improved method of claim 5 wherein attaching the device to the inside of the rear wall of the drum over the first set of perforations is accomplished by magnets attached to the device, and the flexible circular skirt is attached to the rear wall of the drum over and blocking air flow through the second set of perforations by magnets.

7. The improved method of claim 5 wherein registering the number of fan revolutions includes an audible signal being given upon reaching a predetermined number of fan revolutions.

8. The improved method of claim 5 wherein a shroud having a perforated rear wall is around the fan and the diameter of the central opening of the flexible circular skirt is slightly larger than the diameter of the shroud and air flow through the first set of perforations passes through the central opening of the flexible circular skirt, the fan and the shroud.

* * * * *